United States Patent [19]

Ture

[11] Patent Number: 5,401,310
[45] Date of Patent: Mar. 28, 1995

[54] ADDITIVE COMPOSITION WITH INSULATING, IMPERMEABILIZING AND ANTISHRINK PROPERTIES

[75] Inventor: Antonio Ture, Taranto, Italy

[73] Assignee: Somergom S.r.l., Taranto, Italy

[21] Appl. No.: 161,518

[22] Filed: Dec. 6, 1993

Related U.S. Application Data

[63] Continuation-in-part of Ser. No. 915,985, Jun. 8, 1992, abandoned.

[30] Foreign Application Priority Data

Oct. 17, 1990 [IT] Italy ................... 66302 A/90

[51] Int. Cl.⁶ .............................................. C04B 14/26
[52] U.S. Cl. ................................ 106/600; 106/692; 106/717; 106/802; 106/823; 523/401; 524/2
[58] Field of Search ............... 106/38.35, 822, 823, 106/800, 801, 802, 692, 695, 696, 785, 794, 600, 713, 717; 520/1; 523/130, 131, 401; 524/2; 501/84

[56] References Cited

U.S. PATENT DOCUMENTS 4,401,471 8/1983 Eckhardt et al. .................. 501/84

FOREIGN PATENT DOCUMENTS 0054874 6/1982 European Pat. Off. .

OTHER PUBLICATIONS

F. M. Lea "The Chemistry of Cement and Concrete", (1970) E. Arnold Limited, 3rd Edition, London, pp. 533–536 and 569–578.

Japanese Patent Abstract—"Sheath Body", JP 3120893 Toshimitsu, Sanyo Electric Co. Ltd. (May 23, 1991)–see abstract.

Japanese Patent Abstract—"Low Shrinkable Unsaturated Polyester Resin Composition" JP 63243121, Akira, Hitachi Chem. Co. Ltd. (Oct. 11, 1988) see abstract.

*Primary Examiner*—David Brunsman
*Assistant Examiner*—Paul Marcantoni
*Attorney, Agent, or Firm*—Guido Modiano; Albert Josif; Daniel O'Byrne

[57] ABSTRACT

New additive composition, in liquid or powder form, for thin slabs, plasters, concretes, prefabricated elements and refrectory elements, with insulating and impermeabilizing properties and with antishrink characteristics, comprising a bonding agent and an additive comprising a mixture of carbonates containing 59–75% $CaCO_3$, 25–37% $Si(CO_3)_2$, 0–2% $Al_2(CO_3)_3$, 0–1% $MgCO_3$ and 0–1% $Fe_2(CO_3)_3$.

6 Claims, No Drawings

ADDITIVE COMPOSITION WITH INSULATING, IMPERMEABILIZING AND ANTISHRINK PROPERTIES

This application is a continuation-in-part of Ser. No. 07/915,985, filed Jun. 8, 1992, now abandoned.

BACKGROUND OF THE INVENTION

The present invention relates to a composition comprising an additive, in powder or liquid form, with insulating and impermeabilizing properties and with antishrink and flocculating characteristics. These peculiarities make it particularly suitable, more than other similar products, for many applications in civil engineering (thin concrete slabs, plasters, mortars, prefabricated elements, refractory elements, coverings, etc.) and in industrial chemistry (flocculant for water treatment or bonding agent for protective coatings against the corrosion and oxidation of metals, etc.).

The main but not exclusive field of application of the present invention is that of bonding agents. This term indicates substances which, when mixed with water, produce a plastic mass which undergoes, in the course of time, a progressive hardening process until it achieves high mechanical strength. Bonding agents are used to join and keep together other construction elements, to which the mortar adapts and adheres strongly. They are divided into two major categories: air-hardening and hydraulic bonding agents. The first ones (air-hardening limes, plasters, etc.) set and harden only when exposed to air, whereas the second ones (cements, hydraulic limes, etc.) can set and harden even if they are immersed in water. This last property is due to the presence, in hydraulic bonding agents, of a series of compounds (calcium silicates, aluminates and ferrites), which can react with water, producing insoluble or scarcely soluble hydrated products which have cementing properties.

SUMMARY OF THE INVENTION

The present invention is related to an additive composition for building materials, water treatment and protective coating applications, comprising from 99.9 to 85% by weight of a bonding agent and 0.1 to 15% by weight of an additive. For example the additive composition comprises, in weight percentages, from 95 to 85% of bonding agent and from 5 to 15% additive.

According to the present invention, the additive used comprises a mixture of carbonates containing 59–75% $CaCO_3$, 25–37% $Si(CO_3)_2$, 0–2% $Al_2(CO_3)_3$, 0–1% $MgCO_3$ and 0–1% $Fe_2(CO_3)_3$. The mixture of oxides obtained by calcination of the above carbonate mixture, comprises in weight percentages, 65 to 80% CaO, 20 to 30% $SiO_2$, 0 to 2% $Al_2O_3$, 0 to 1% MgO and 0 to 1% $Fe_2O_3$.

DESCRIPTION OF THE PREFERRED EMBODIMENTS

The bonding agent with which the additive is employed according to the present invention, so as to confer improved insulating, impermeabilizing and antishrink properties, can mainly comprise cements of any kind used in building materials, alone or in mixture with further components known to improve their physical, thermal and impermeableness characteristics.

Alternatively, other bonding materials can be employed which are known to be useful in building materials or for other applications such as water treatment or protective coating applications, such as anticorrosive coatings.

In particular the bonding agent can be selected from:
(i) a cement of any type (Portland, pozzolanic, slag, aluminous, blast furnance, quick setting, refractory, etc.) having an average grain size of 60 μm;
(ii) synthetic resins or natural polymers, amongst which butadiene and styrene based polymers and co-polymers can be mentioned merely by way of nonlimitative examples;
(iii) silicates and binding acids, for example calcium, aluminium or sodium silicates and phosphoric acid or aluminum phosphate.

The above bonding agents can be used alone or in various blends one with the other according to the intended final use and based on the common technical knowledges in the respective field of application. They can also comprise various inert materials such as expanded clay, silica sand, alumina, magnesite, calcareous grit, etc. with an average grain size of 60 micrometers, which can be used in various proportions up to 50% of the bonding agent, according to the common knowledge in the field.

The additive used to carry out the present invention comprises said mixture of carbonates wherein the carbon content can range from 1% up to 30% by weight, for example up to 20% by weight of the mixture.

The additive composition according to the invention comprising said carbonates additive and one or more selected bonding agent, can be prepared in powder or liquid form.

The powder is obtained by the following processing steps:

mixing of the components with an appropriate amount of water, so as to obtain a final mix in the form of a mortar;

hardening (also facilitated by heating);

grinding so as to obtain a powder.

The liquid form of the additive composition is instead obtained by adding to the above mixture, before hardening, at least one resin selected from epoxy, acrylic, phenolic, polyurethane, or other resins known for uses with bonding agents.

The additive composition according to the invention has improved physical, thermal and other characteristics, among which mention is made of:

lower thermal conductivity with respect to that of known powder cements;

a much lower thermal expansion with respect to said known powder cements; in particular at low temperatures (−20° to +20° C.), the expansion of the additive composition according to the invention is approximately six times smaller, whereas at higher temperatures (+20° to +80° C.) it becomes approximately twenty times smaller, being anyway equal or lower than $0.8 \times 10^{-6}$ mm/mm K a high specific heat. In particular, it is three to four times higher than that of an ordinary Portland cement, being of at least 4J/g/°C.;

a rather short setting time, in any case comparable with that of quick-setting cements;

a low permeability to water vapor, of no more than $3 \times 10^{-11}$ Kg/(m.s.Pa)

an equally low permeability to water, of no more than $3 \times 10^{-9}$ m/s a complete absence of toxicity, as shown by a low release both in oil and in a solution of 15% ethanol and 3% acetic acid according to Italian standards set in DM 21/3/73;

a high agglomerating capacity for oils and organic substances;

a high resistance to penetration by ultraviolet rays;

a considerable durability;

a good fire resistance.

These characteristics allow one to use the additive composition of the invention, in powder or liquid form, with better results than those which can be obtained with other similar products, especially in the field of civil engineering, among which the following are mentioned by way of non-limitative example:

thin concrete slabs for industrial pavement or floors allowing transit of heavy vehicles;

thin waterproof insulating slabs for walkable outdoor pavements;

waterproof and insulating plasters;

mortar, bricks, prefabricated elements, refractory elements;

protective, insulating, corrosion-resistant, oxidation-resistant and impermeabilizing coverings for every surface of any kind of material (metal, polymer, cement, wood, etc.).

The inventive additive composition is furthermore suitable for being used as flocculant for the treatment of water.

EXAMPLE

A practical formulation of the additive according to the invention comprises a mixture of carbonates having a carbon content of 16% by weight, a weight loss upon calcination of 69,21%, a calcination residue of 30,79% by weight, and a metal and metalloid content, expressed as % by weight of the respective oxides obtained by calcination of the carbonate mixture of:

0.32% $Fe_2O_3$, 72,53% $CaO$, 25,64% $SiO_2$, 0,98% $Al_2O_3$ and 0,49% $MgO$.

This additive is mixed with Portland cement in a proportion of 10% additive and 90% cement and is used for manufacturing building materials such as plasters and slabs.

I claim:

1. Additive composition for building materials, water treatment and protective coating applications comprising from 99.9% to 85% by weight of a bonding agent and 0.1 to 15% by weight of an additive, wherein the additive comprises a mixture of carbonates containing 59–75% $CaCO_3$, 25–37% $Si(CO_3)_2$, 0–2% $Al_2(CO_3)_3$, 0–1% $MgCO_3$ and 0–1% $Fe_2(CO_3)_3$, said bonding agent being selected from a group consisting of Portland cement, pozzolanic cement, aluminous cement, and synthetic resins, silicates, phosphoric acid and aluminum phosphate, alone or in mixture with a cement.

2. Additive composition according to claim 1, wherein said synthetic resin is selected from the group consisting of butadiene or styrene polymers or copolymers.

3. Additive composition according to claim 1, wherein said silicates are selected from a group consisting of calcium, aluminium and sodium silicates.

4. Additive composition according to claim 1, wherein said bonding agent is phosphoric acid.

5. Additive composition according to claim 1 wherein said composition is prepared in a powder form.

6. Additive composition according to claim 1 wherein said composition is prepared in a liquid form, said composition further comprising a resin selected from a group consisting of epoxy, acrylic, phenolic, and polyurethane resins, said resin being mixed with said additive and bonding agent.

* * * * *